United States Patent
Sakamoto et al.

[11] Patent Number: 5,938,870
[45] Date of Patent: Aug. 17, 1999

[54] PNEUMATIC RADIAL TIRE HAVING INNER CARCASS PLY CORD TENSION SMALLER THAN THE OUTER CARCASS PLY CORD TENSION

[75] Inventors: Masayuki Sakamoto, Shirakawa; Toshihiko Omokawa, Fukushima-ken; Masahiro Hanya, Kobe, all of Japan

[73] Assignee: Sumitomo Rubber Industries, Ltd., Hyogo-Ken, Japan

[21] Appl. No.: 08/843,349

[22] Filed: Apr. 15, 1997

Related U.S. Application Data

[62] Division of application No. 08/627,130, Apr. 3, 1996, Pat. No. 5,656,108, which is a division of application No. 08/465,013, Jun. 5, 1995, Pat. No. 5,538,572.

[30] Foreign Application Priority Data

Jun. 10, 1994 [JP] Japan .................................. 6-152601
Mar. 20, 1995 [JP] Japan .................................. 7-087403

[51] Int. Cl.$^6$ .................. B60C 9/02; B60C 9/08; B60C 15/00
[52] U.S. Cl. ................. 152/550; 152/454; 152/543; 152/547; 152/552; 152/553; 152/554; 152/556; 152/557; 156/123
[58] Field of Search .................... 156/133, 123, 156/110.1; 152/454, 543, 547–548, 550, 552–554, 556–558

[56] References Cited

U.S. PATENT DOCUMENTS

| | | | |
|---|---|---|---|
| 3,245,454 | 4/1966 | Lewis | 152/557 X |
| 3,500,888 | 3/1970 | Boileau | 152/557 X |
| 3,709,277 | 1/1973 | Montagne | 152/558 |
| 4,378,041 | 3/1983 | Tsurunaga et al. | 152/133 X |
| 4,972,893 | 11/1990 | Komai et al. | 152/557 |
| 5,526,863 | 6/1996 | Hodges | 152/550 X |

FOREIGN PATENT DOCUMENTS

| | | | |
|---|---|---|---|
| 2075851 | 10/1971 | France . | |
| 3825515 | 2/1989 | Germany . | |
| 3197204 | 8/1991 | Japan . | |
| 4-95502 | 3/1992 | Japan | 152/557 |

OTHER PUBLICATIONS

Patent Abstracts of Japan, vol. 016, No. 331 (M–1282) Jul. 20, 1992 & JP–A–04 095502 (Bridgestone Corp.) Mar. 27, 1992.

Patent Abstracts of Japan, vol. 13, No. 432 (M–874) Sep. 27, 1989 & JP–A–01 164603 (Ohtsu Tire & Rubber Co. Ltd.) Jun. 28, 1989.

*Primary Examiner*—Adrienne C. Johnstone

[57] ABSTRACT

A pneumatic radial tire comprises a carcass comprising an outer carcass ply made of cords having a first heat-shrinkage-percentage K1 and an inner carcass ply is made of cords having a second heat-shrinkage-percentage K2 different from the first heat-shrinkage-percentage K1, and the cord tension of the inner carcass ply is smaller than the cord tension of the outer carcass ply. A method of making the tire comprises steps of making the outer carcass ply of cords having a first heat-shrinkage-percentage K1, making the inner carcass ply of cords having a second heat-shrinkage-percentage K2, wherein the first heat-shrinkage-percentage K1 at 150 degrees C. is 120 to 160% of the second heat-shrinkage-percentage K2 at 150 degrees C., and heating and vulcanizing a raw tire to heat-shrink the outer carcass ply cords in a larger degree than the inner carcass ply.

9 Claims, 6 Drawing Sheets

PNEUMATIC RADIAL TIRE HAVING INNER CARCASS PLY CORD TENSION SMALLER THAN THE OUTER CARCASS PLY CORD TENSION

This application is a divisional of application Ser. No. 08/627,130, filed on Apr. 3, 1996, now U.S. Pat. No. 5,656,108, which is a divisional of application Ser. No. 08/465,013 filed Jun. 5, 1995, now U.S. Pat. No. 5,338,572, the entire contents of which are hereby incorporated by reference.

BACKGROUND OF THE INVENTION

The present invention relates to a pneumatic tire and a method of making the same, and more particularly to an improvement relating to the carcass by which the road noise is reduced.

Recently, passenger cars strongly require its less noise generation and quietness during vehicle operation. Therefore, it is necessary to decrease the noise generated from tires and the transmission of the noise from the tire to the inside of the car. Road noise is a type of noise heard in a car. Road noise has a peak in the low frequency range of around 250 Hz, which is almost the same as the resonance frequency of passenger cars. During running, the tread portion vibrates due to the roughness of the road surfaces, and the vibrations are transmitted through a suspension mechanism and amplified to about 250 Hz. Therefore, the inside of the car tends to resonate or vibrate which is very uncomfortable for the driver. This is especially noticeable in a radial tire whose tread portion is reinforced with a stiff belt.

It is therefore necessary for reducing the road noise, to decrease the sound level of a peak with a frequency about 250 Hz.

In order to reduce the road noise, the tread rubber harness is decreased to decrease the tread rigidity, or the tread rubber thickness is increased to provide a cushion effect against the shock which the tread receives, or a foam rubber material is adhered to the inner surface of the tire as a vibration damper layer.

In such conventional countermeasure, however, desirable results can not be obtained. If the tread rigidity is decreased, the cornering force deteriorates and the steering stability is deteriorated. If the damper layer is used, the ride comfort is impaired, and the tire loses its weight balance about its rotational axis. Further, the manufacturing method increases in the number of the steps and the manufacturing cost increases.

SUMMARY OF THE INVENTION

It is therefore, an object of the present invention to provide a pneumatic tire and a method of making the same, in which the noise sound level of around 250 Hz can be decreased to decrease road noise, without suffering from the above-mentioned problems.

According to one aspect of the present invention, a pneumatic tire comprises a tread portion, a pair of axially spaced bead portions with a bead core therein, a pair of sidewall portions, a carcass comprising an inner ply and an outer ply each extending between the bead portions, and a belt disposed radially outside the carcass and inside the tread portion, wherein the outer carcass ply is made of cords having a first heat-shrinkage-percentage K1 and the inner carcass ply is made of cords having a second heat-shrinkage-percentage K2 different from the first heat-shrinkage-percentage so that the cord tension of the inner carcass ply is smaller than the cord tension of the outer carcass ply.

According to another aspect of the present invention, a method of making the pneumatic tire comprises steps of building a raw tire by assembling the inner and outer carcass plies, and heating the raw tire in a mold to vulcanize the tire, wherein the outer carcass ply is made of cords having a first heat-shrinkage-percentage K1 and the inner carcass ply is made of cords having a second heat-shrinkage-percentage K2 different from the first heat-shrinkage-percentage K1, wherein the first heat-shrinkage-percentage K1 at 150 degrees C. is 120 to 160% of the second heat-shrinkage-percentage K2 at 150 degrees C., whereby, in the finished tire, the cord tension of the inner carcass ply is smaller than the cord tension of the outer carcass ply.

As a result, the resonance frequency of the sidewall portions is changed to a higher frequency than 250 Hz by the above-mentioned carcass construction, and the vibration transmitting percentage at 250 Hz is decreased. Accordingly, the resonance of the car is controlled and the road noise is reduced.

Further, as the heat-shrinkage-percentage of the inner carcass ply cords is low, the finished tire is improved in dimensional stability and exhibits a good steering stability and flat spot resistance.

BRIEF DESCRIPTION OF THE DRAWINGS

An embodiment of the present invention will now be explained according to the drawings.

DESCRIPTION OF THE PREFERRED EMBODIMENTS

Figure 1:
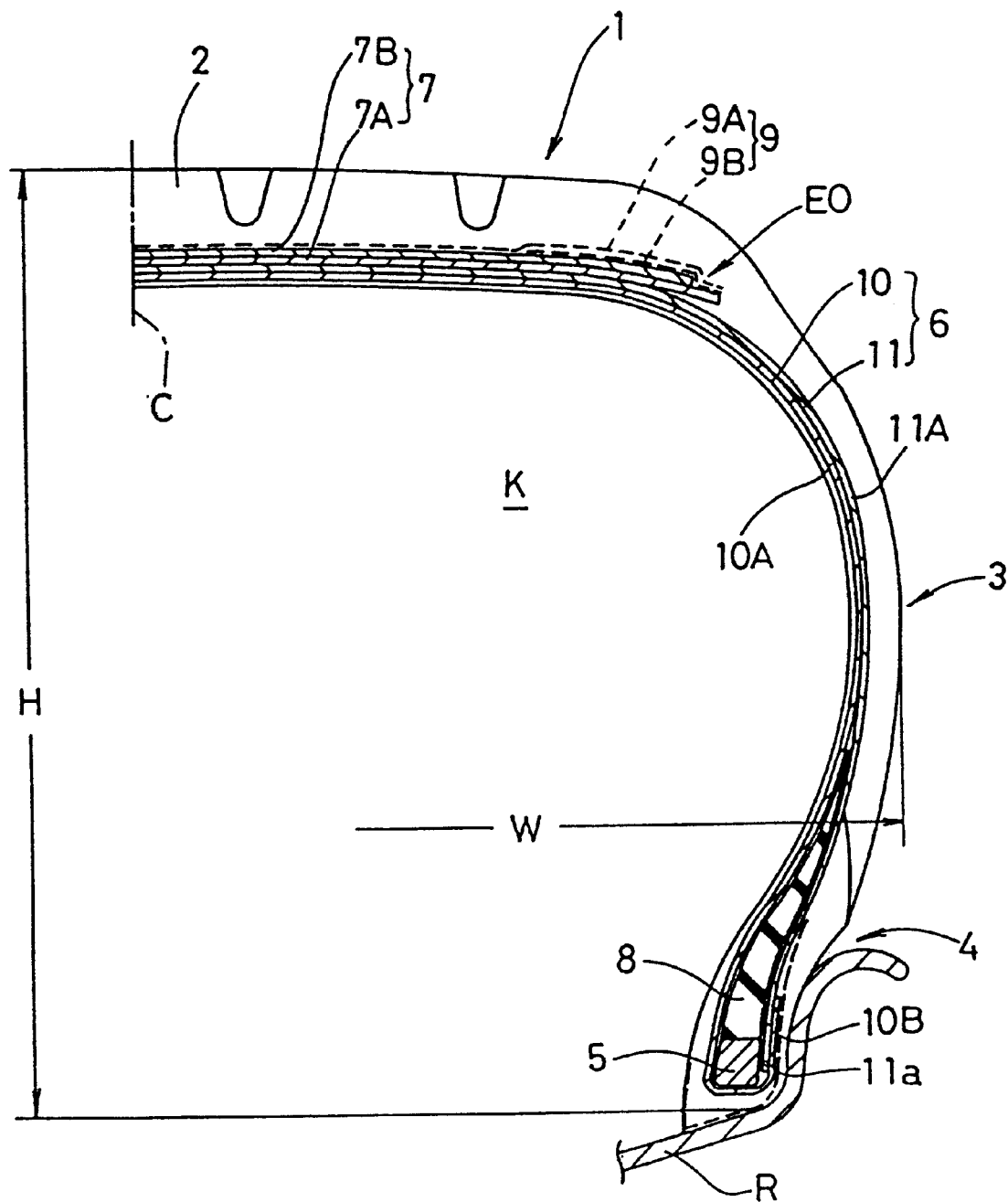
FIG. 1 is a cross sectional view of a tire according to the present invention.

In the drawings, the pneumatic radial tire 1 according to the present invention comprises a tread portion 2, a pair of sidewall portions 3 each extending radially inwardly from each edge of the tread portion 2, a pair of axially spaced bead portions 4 each located at the inner end of each of the sidewall portions 3, a pair of bead cores 5 each disposed in each of the bead portions 4, a carcass 6 extending between the bead portions 4, surrounding the tire cavity K, a belt (7, 9) disposed radially outside the carcass 6 and inside the tread portion 2, and a bead apex 8 disposed in each of the bead portions 4.

Figure 4:
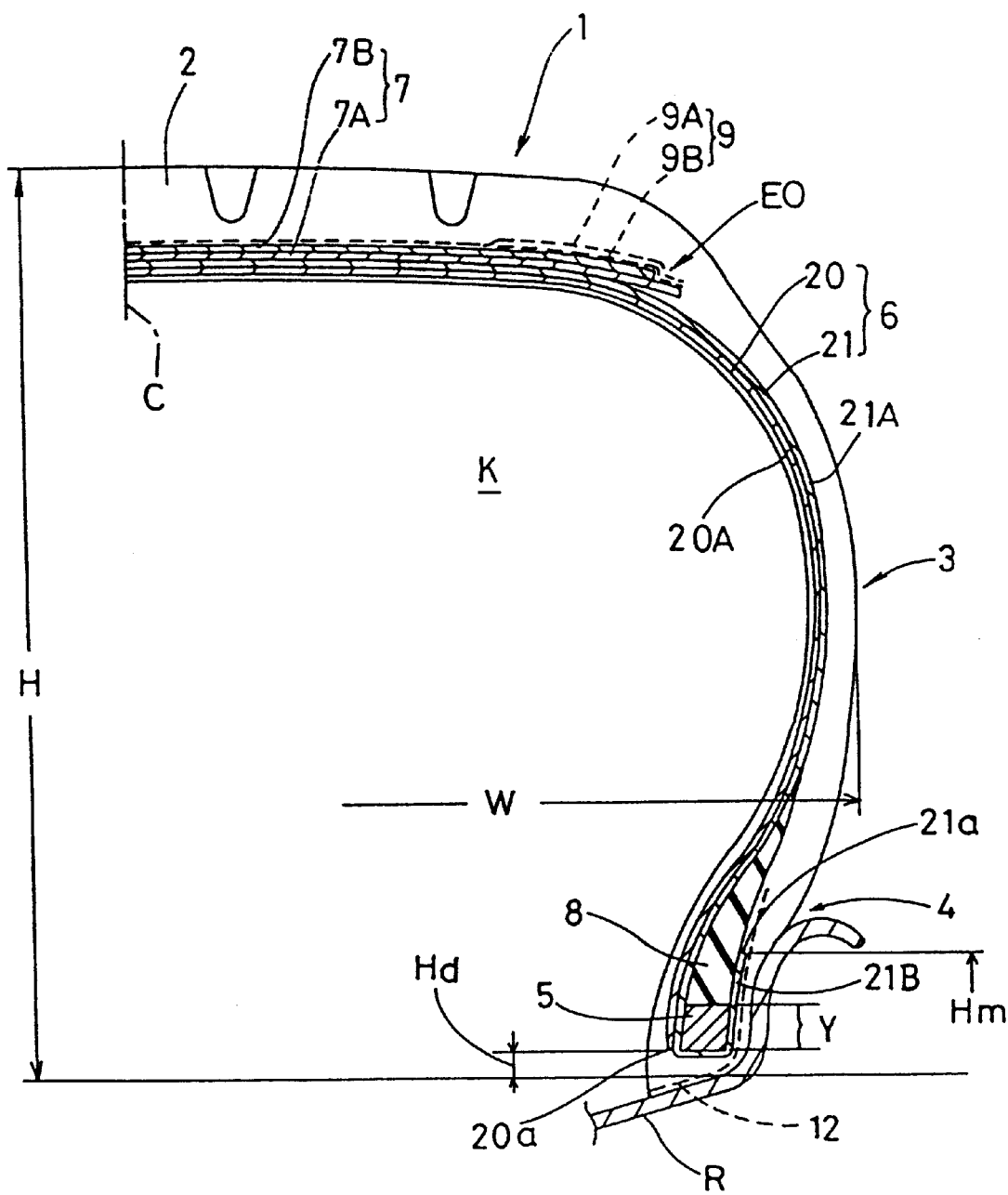
FIG. 4 is a cross sectional view of a tire showing another example of the carcass structure.

In FIGS. 1 and 4 is shown is a standard state of the tire mounted on a standard rim R and inflated to a standard inner pressure specified in JIS and the like.

The tire 1 is formed as a low aspect ratio passenger radial tire having an aspect ratio H/W—the ratio of the tire section height H to the tire maximum width W—of not more than 0.70, for example 0.65.

The bead apex 8 is made of a high rigidity rubber having a substantially triangular cross-sectional shape and extending radially outwardly from the bead core 5, so as to reinforce the bead portion 4 and the sidewall lower portion. Preferably, a rubber compound having a JIS-A hardness of 80 to 95 degrees, and a complex elastic modulus E* of 300 to 600 kg/sq.cm is used for the bead apex 8.

Each bead portion 4 is further provided with a chafer 12 extending along the bottom face of the bead portion 4 in order to prevent the bead portion 4 from being chafed by the rim R during running and from being damaged at the time of the mounting operation. The chafer 12 is extended radially outwardly to cover the radially outer edge of a carcass turnup portion (described hereinafter).

The belt comprises a breaker belt 7 and further a band belt 9 in this embodiment.

The breaker belt 7 comprises two plies 7A and 7B of high modulus belt cords, e.g. steel cords, aromatic polyamide fiber cords and the like. The plans are laid at a small angle of not more than 35 degrees with respect to the tire equator C, so that the cords in one ply 7A are laid in a different direction from that in the other ply 7B so as to cross each other.

The band belt 9 is disposed radially outside the breaker belt 7, covering at least the axially outer edges EO of the breaker belt 7, to prevent the breaker belt 7 from being lifted during high speed running. The band belt 9 in the example comprises a pair of axially spaced, narrow width, inner plies 9B disposed on the radially outside of the breaker belt 7 to cover the edges EO thereof, and an outer ply 9A disposed radially outside thereof to cover the overall width of the breaker belt 7. Each of the band plies 9A and 9B is made of low modulus cords, for example nylon, having a diameter smaller than that of the breaker cords and laid at an angle of 0 to 10 degrees with respect to the tire equator C.

According to the present invention, the carcass 6 comprises two plies, an inner carcass ply (10, 20, 30) and an outer carcass ply (11, 21, 31) each extending from one of the bead portions 4 to the other bead portion 4 through the sidewall portions 3 and tread portion 2. At least one of the inner and outer carcass plies is turned up around the bead cores 5 to form a pair of turnup portions. The inner and outer carcass plies are made of carcass cords arranged at an angle of from 70 to 90 degrees, in this example nearly 90 degrees, with respect to the tire equator C. For the carcass cords, organic fiber cords, e.g. polyester, rayon, nylon and the like are used.

Figure 2:
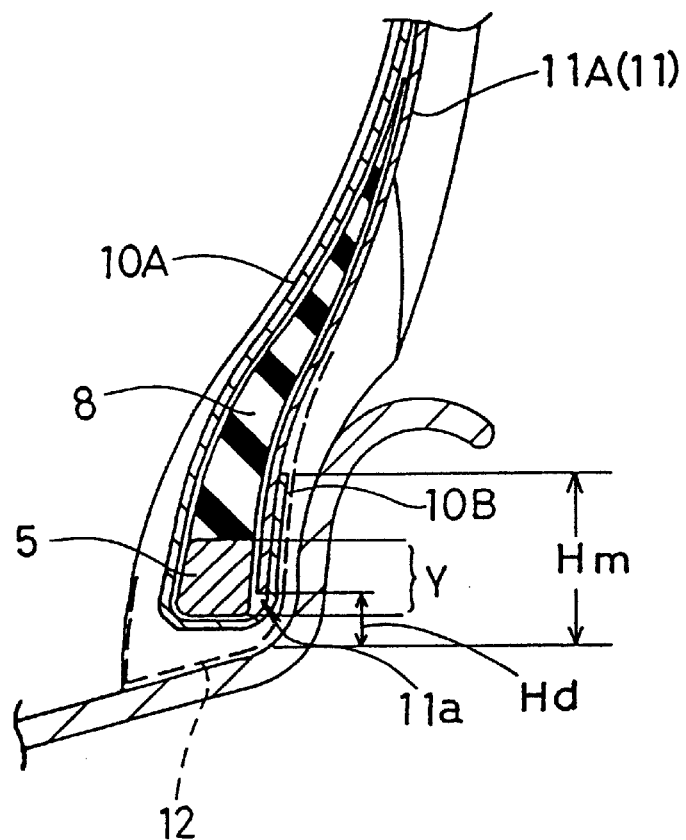
FIG. 2 is an enlarged cross sectional view of the bead portion thereof showing an example of the carcass structure.

In FIGS. 1 and 2, the inner carcass ply 10 is turned up around the bead cores 5 from the inside to the outside of the tire to form a pair of turnup portions 10B and a toroidal main portion 10A therebetween, whereby the above-mentioned bead apex 8 is positioned between the main portion 10A and turnup portion 10B. The outer carcass ply 11 is however, not turned up around the bead cores. Therefore, it consists of a toroidal main portion 11A disposed outside the main portion 10A of the inner carcass ply 10. The radially inner edge 11a of the main portion 11A is secured between the axially outer surface of the bead apex 8 and the axially inner surface of the turnup portion 10B.

Figure 3:
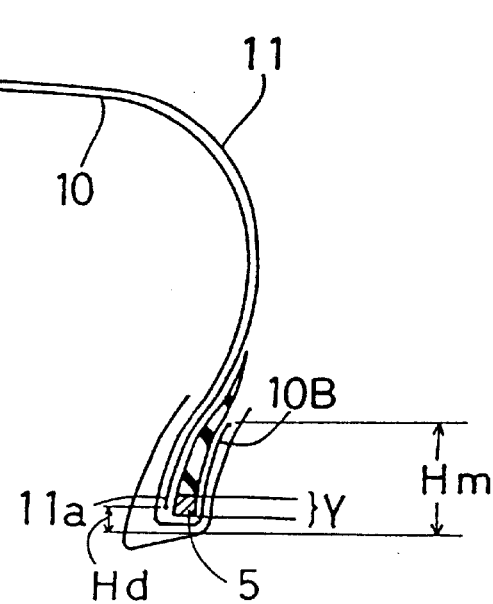
FIG. 3 is a schematic cross sectional view showing another example of the carcass structure.

FIG. 3 shows a modification of the outer carcass ply 11, in which its radially inner portion extends along the axially inner surface of the bead apex 8, and the inner edge 11a thereof is secured between the bead apex 8 and the main portion 10A.

Thus, the radially inner edge portions of the main portions 10A and 11A of the inner and outer carcass plies 10 and 11 are tightly secured to the bead cores 5 in the bead portions 4.

FIG. 4 shows still another example of the carcass 6, which comprises an inner ply 20 and an outer carcass ply 21. The outer carcass ply 21 is turned up around the bead cores 5 from the inside to the outside of the tire to form a pair of turnup portions 21B and a toroidal main portion 21A therebetween, whereby the bead apex 8 is positioned between the main portion 21A and turnup portion 21B. The inner carcass ply 20 is not turned up around the bead cores. Therefore, it consists of a toroidal main portion 20A extending along and adjacent to the inner surface of the main portion 21A. The inner edges 20a thereof terminate at almost the same height as the radially inner end of the bead core 5.

Figure 5:
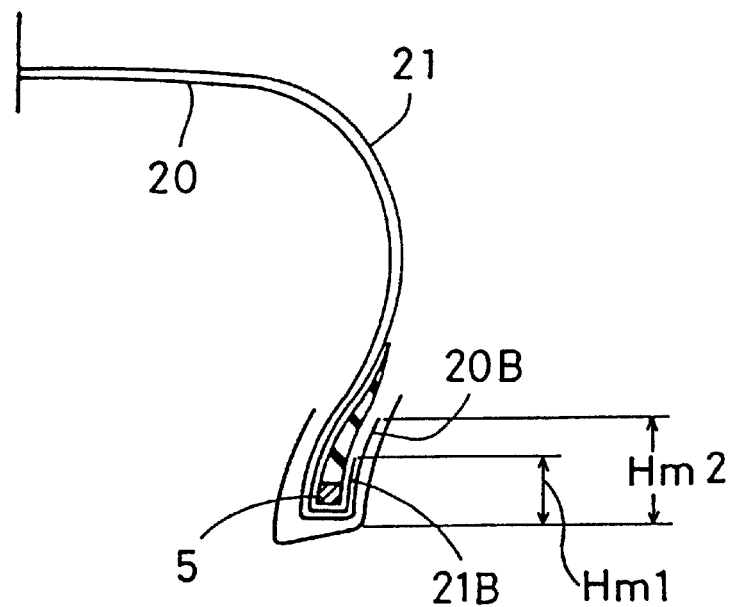
FIG. 5 is a schematic cross sectional view showing still another example of the carcass structure.

FIG. 5 shows a modification of the inner carcass ply 20, in which the inner carcass ply 20 is also turned up around the bead cores 5 so as to form a turnup portion 20B in the same way as the outer carcass ply 21. In this case, the turnup portion 20B is preferably extended radially outwardly to completely cover the turnup portion 21B of the outer carcass ply 21.

Figure 6:
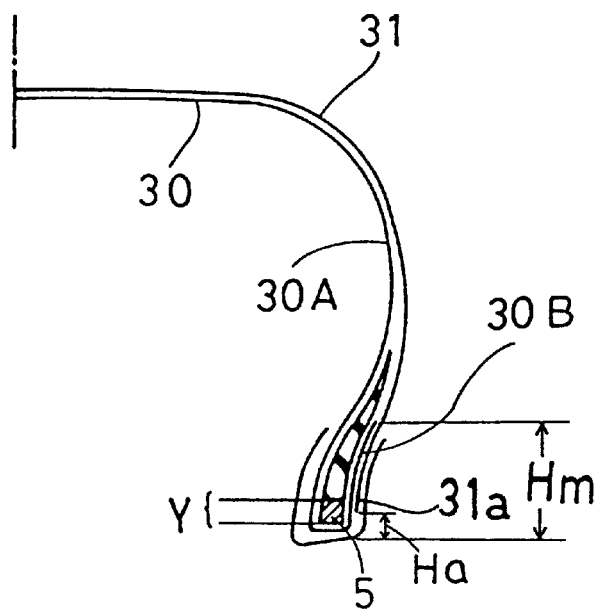
FIG. 6 is a schematic cross sectional view showing yet another example of the carcass structure.

FIG. 6 shows a modification of the carcass 6 shown in FIGS. 1 and 2. In this example, the inner carcass ply 30 comprises a main portion 30A and a pair of turnup portions 30B turned up around the bead cores 5 from the axially inside to the outside. The outer carcass ply 31 is not turned up, and the radially inner edge 31a is disposed axially outside of the turnup portion 30B of the inner carcass ply 30, and terminates near the bead core 5.

In any case, the radially inner edges 11a (FIGS. 1–3), 20a (FIG. 4) and 31a (FIG. 6) terminate within a range Y between the radially inner and outer ends of the bead core. As a result, the sharing stress concentration on the inner edge when the bead is deformed, can be prevented.

On the other hand, the radially outer edges of the turnup portions 10B (FIGS. 1–3), 21B (FIG. 4), 20B–21B (FIG. 5) and 30B (FIG. 6) terminate at a height Hm radially outward of the radially outer end of the bead core 5 but radially inward of the radially outer edge of the flanges of the rim R, to thereby avoid the sharing stress concentration on the edge.

According to the invention, the cord tension of the outer carcass ply is set to be larger than the cord tension of the inner carcass ply in the finished tire.

To achieve this, in the process of building a raw tire, organic cords having different heat-shrinkage-percentages K1 and K2 are used to make the raw carcass plies. Then, to vulcanize the raw materials, the tire is put into a mold and heated while pressurizing the inside of the tire.

In order to practice such processes, the nowadays widely used tire making methods can be utilized. If explained briefly, such tire making methods comprise the following steps or processes: the raw carcass plies are wound around a cylindrical drum's surface; the bead cores and bead apexes are disposed thereon while providing a space therebetween and decreasing the space between the bead cores, the drum is expanded so that the carcass has a toroidal shape; on the crown portion of the carcass, the breaker plies and band plies are disposed; and a rubber tread, sidewalls, beads and other layers are disposed thereon to form a raw tire. Then the raw tire is put in a mold and vulcanized.

According to the present invention, the cords for the outer carcass ply (11, 21, 31) have a first heat-shrinkage-percentage K1 and the cords for the inner carcass ply (10, 20, 30) have a second heat-shrinkage-percentage K2 which is different from K1. That is, a plurality of organic cords having the second heat-shrinkage-percentage K2 are laid parallel with each other and embedded in topping rubber in the form of a rubber sheet. This sheet is cut in a suitable size and wound around the above-explained drum as the raw inner carcass ply (10, 20, 30). Similarly, a plurality of organic cords having the first heat-shrinkage-percentage K1 are laid parallel with each other and embedded in topping rubber in the form of a rubber sheet and cut into a suitable size. This sheet is wound around the previously wound inner carcass ply as the raw outer carcass ply (11, 21, 31) so that the inner carcass ply cords cross the outer carcass ply cords at a small angle.

Thereafter, in the tire vulcanizing process, these raw plies are heated and then cooled. As a result, through the vulcanizing process, the outer carcass ply cords are heat-shrunk to a larger degree than the inner carcass ply cords, and thus the outer carcass ply is greatly increased in cord tension compared to the inner carcass ply in the finished tire.

Here, the first heat-shrinkage-percentage K1 is set in the range of from 120 to 160%, more preferably 130 to 150%, of the second heat-shrinkage-percentage K2. If K1 is less than 120% of K2, the noise reduction is insufficient. If K1 is more than 160% of K2, the tire rigidity decreases and the steering stability deteriorates, and furthermore, the noise has a tendency to increase.

In order to maintain the dimensional stability of the finished tire, the heat-shrinkage-percentage K2 of the inner carcass ply is preferably set in the range of from 3.5 to 5.0%.

The above-mentioned heat-shrinkage-percentage is obtained as follows. First, the original length (x) of the cord is measured, and the cord is put in a 150 degrees C. atmosphere for 20 minutes without being loaded. Then the length (z) of the heat-shrunken cord is measured to find out the heat shrinkage (y). (y=x−z). The heat-shrinkage-percentage is calculated as (y/x)×100.

The above-mentioned difference between the heat-shrinkage-percentages K1 and K2 can be provided as follows.

When the inner carcass ply is materially the same as the outer carcass ply, the difference is provided by heat-shrinking both the inner and outer carcass ply cords prior to vulcanization under different heat-treating conditions, e.g. heating time, temperature and the like, or alternatively, by heat-shrinking only the inner carcass ply cords prior to vulcanization to decrease the heat-shrinkage-percentage K2.

Further, during treatment of the cord by dipping into resin or latex, by changing the cord tension, the heat-shrinkage-percentage can be changed. If the cord tension is increased during the dip treatment, the heat-shrinkage during tire vulcanization is increased.

Furthermore, in case of the same material, the crystal structure of the cord is changed. For example, a regular polyester cord and a high-modulus polyester cord are used.

Figure 8A:
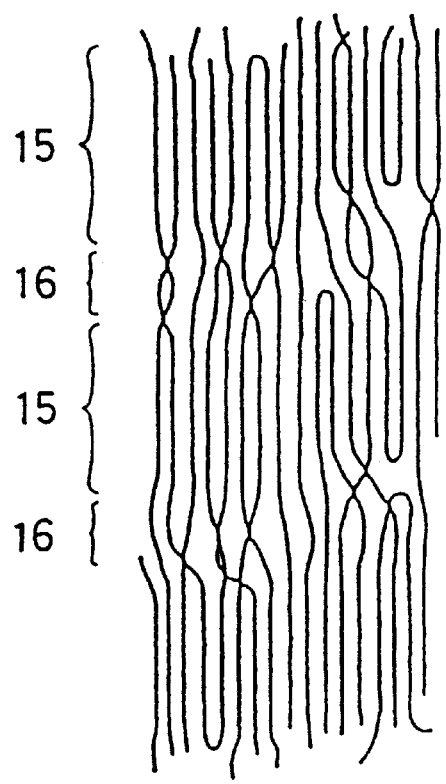
FIGS. 8(a), (b) are diagrams for explaining crystal structures of the carcass cord.
Figure 8B:
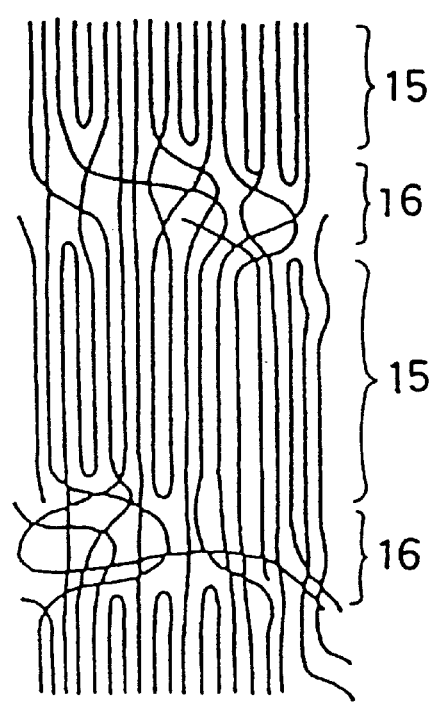

FIGS. 8(a) and (b) diagrammatically show the crystal structure of a regular polyester and that of a high modulus polyester. In FIGS. 8(a) and (b), 15 is the crystal region, and 16 is the amorphous region. Between the regular modulus polyester and the high modulus polyester, the size, percentage, and orientation of such regions differ. The high modulus polyester exhibits a low heat-shrinkage-percentage, and the regular polyester exhibits a higher heat-shrinkage-percentage.

Still further, the different cord materials may be used. For example, a nylon fiber cord and a polyester fiber cord can be used.

However, materially the same cords are preferably used in view of tire performances.

Figure 7:
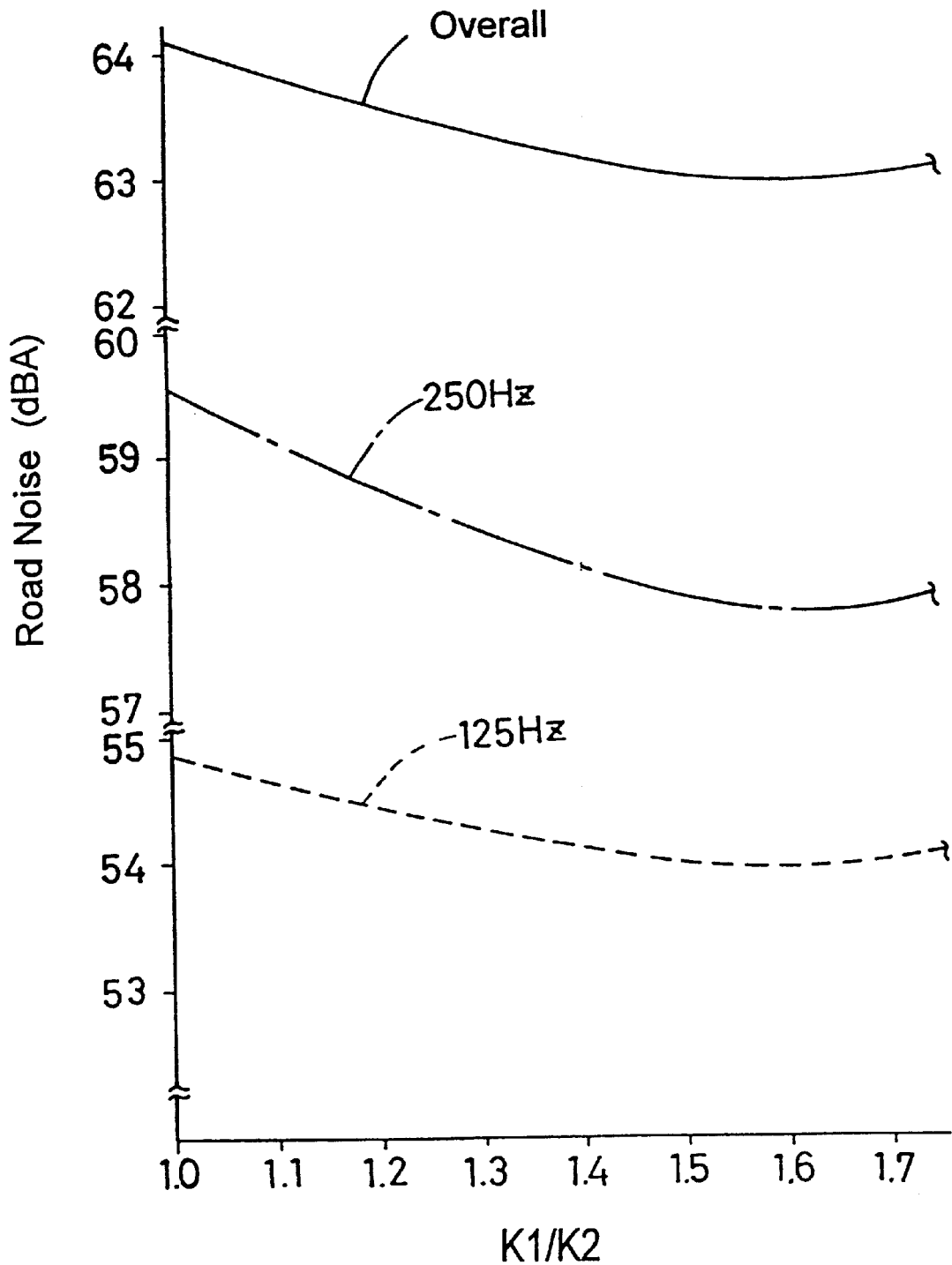
FIG. 7 is a graph showing the relationship between the heat-shrinkage-percentage ratio K1/K2 and the road noise.

FIG. 7 shows a relationship between the ratio K1/K2 and the road noise, obtained through a test. In the test, test tires of size 215/65R15 mounted on a standard rim of 15×6 1/2JJ and inflated to a pressure of 2.0 ksc were installed on the front and rear wheels of a FR-type passenger car. Then, the test car was run on a rough asphalt road at a constant speed of 50 km/h, and the noise was measured in the car near the driver's ear on the inner side of the car.

As shown in FIG. 7, as the ratio K1/K2 increases, overall noise decreases, and the 250 Hz noise especially decreases when the ratio K1/K2 is in the range of from 1.20 to 1.60.

Test tires of a size 215/65R15 having the same structure as shown in FIG. 1 except for the carcass constructions, were prepared and tested for road noise, steering performance, ride comfort, flat spot resistance and tire uniformity. The specifications and test results are shown in Table 1 and Table 2.

The road noise was measured in the same way as in the noise test mentioned in relation to FIG. 7. In Tables 1 and 2, the noise in each carcass construction (FIGS. 1–2, 6, 7, 8 or 3) is expressed in decibel as the difference from a conventional arrangement (K1=K2).

The ride comfort and steering stability were evaluated by the driver while running on a dry asphalt road.

The flat spot resistance was evaluated by the driver while running at 60 km/h for 1 km after the test tire (size:215/65R15), mounted on a standard rim (size:15×6 1/2JJ) and inflated to a standard inner pressure (2.0 ksc) and loaded with 500 kg, was not permitted to move for five days.

As for tire uniformity, the radial force variation (RFV) was measured according to JASO-C607 (Test method for automobile tire uniformity).

In the case where both the inner and outer carcass plies were made of materially the same regular polyester cords, in order to provide a difference in the heat-shrinkage-percentages, the cords underwent different heat treatments before vulcanizing the tire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Ex.a1 | Ex.a2 | Ex.a3 | Ex.a4 | Ex.a5 | Conven.a | Ref.a1 | Ref.a2 |
|---|---|---|---|---|---|---|---|---|
| CARCASS | | | | | | | | |
| Construction | | | | FIG. 1, 2 | | | | |
| Ha (aa) | | | | 20 | | | | |
| Hd (aa) | | | | 6 | | | | |
| *Inner carcass ply* | | | | | | | | |
| No. of ply | 1 | 1 | 1 | 1 | 1 | 1 | 1 | 1 |
| Ply type *1 | TUP | TUP | TUP | TUP | TUP | TUP | TUP | TUP |
| Cord material *2 | HM-PE 1500d/2 | HM-PE 1500d/2 | HM-PE 1500d/2 | HM-PE 1500d/2 | HM-PE 1500d/2 | HM-PE 1500d/2 | HM-PE 1500d/2 | RG-PE 1500d/2 |
| Finished cord count (ends/5 cm) | 53.5 | 53.5 | 53.5 | 53.5 | 53.5 | 53.5 | 53.5 | 53.5 |
| Cord angle (deg.) | 90 | 90 | 90 | 90 | 90 | 90 | 90 | 90 |
| Heat shrinkage percentage K2(%) | 4.7 | 4.7 | 4.7 | 4.7 | 4.7 | 4.7 | 4.7 | 7.0 |
| *Outer carcass ply* | | | | | | | | |
| No. of ply | 1 | 1 | 1 | 1 | 1 | 1 | 1 | 1 |
| Ply type *1 | DWN | DWN | DWN | DWN | DWN | DWN | DWN | DWN |
| Cord material *2 | RG-PE 1500d/2 | RG-PE 1500d/2 | RG-PE 1500d/2 | RG-PE 1500d/2 | RG-PE 1500d/2 | HM-PE 1500d/2 | RG-PE 1500d/2 | RG-PE 1500d/2 |
| Finished cord count (ends/5 cm) | 53.5 | 53.5 | 53.5 | 53.5 | 53.5 | 53.5 | 53.5 | 53.5 |
| Cord angle (deg.) | 90 | 90 | 90 | 90 | 90 | 90 | 90 | 90 |
| Heat shrinkage perentage K2(%) | 5.7 | 6.0 | 6.5 | 7.0 | 7.5 | 4.7 | 8.0 | 7.0 |
| K1/K2 ratio | 1.21 | 1.28 | 1.38 | 1.49 | 1.59 | 1.0 | 1.70 | 1.0 |
| BELT | | | | | | | | |
| No. of ply | 2 | 2 | 2 | 2 | 2 | 2 | 2 | 2 |
| Cord material | steel | steel | steel | steel | steel | steel | steel | steel |
| Finished cord count (ends/5 cm) | 34 | 34 | 34 | 34 | 34 | 34 | 34 | 34 |
| Finished cord angle (deg.) | 24 | 24 | 24 | 24 | 24 | 24 | 24 | 24 |
| *Test Result *3* | | | | | | | | |
| *Noise* | | | | | | | | |
| Overall | −0.2 | −0.6 | −1.0 | −1.2 | −1.2 | 0 | −1.3 | −1.3 |
| 125 Hz | −0.2 | −0.5 | −0.8 | −0.9 | −0.9 | 0 | −1.0 | −0.8 |
| 250 Hz | −0.4 | −1.0 | −1.5 | −1.7 | −1.8 | 0 | −1.9 | −1.8 |
| Steering stability | A | A | A | A | B | A | C | A |
| Ride comfort | A | A | A | A | A | A | B | A |
| Flat spot resistance | A | A | A | A | A | A | A | B |
| Tire uniformity | A | A | A | A | A | A | A | A |

1) TUP = turned up DFK = not turned up
2) HM-PE = High modulus polyester RG-PE = Regular polyester
3) A = Good, B = a little no good, C = No good

TABLE 2

|  | Ex.b | Conven.b | Ex.c | Conven.c | Ex.d | Conven.d | Ex.e | Conven.e |
|---|---|---|---|---|---|---|---|---|
| CARCASS | | | | | | | | |
| Construction | FIG. 4 | | FIG. 5 | | FIG. 6 | | FIG. 3 | |
| Ha (aa) | 20 | | Ha2 = 20, Ha1 = 10 | | 20 | | 20 | |
| Hd (aa) | 6 | | — | | 6 | | 6 | |
| *Inner carcass ply* | | | | | | | | |
| No. of ply | 1 | 1 | 1 | 1 | 1 | 1 | 1 | 1 |
| Ply type *1 | TUP | TUP | TUP | TUP | TUP | TUP | TUP | TUP |
| Cord material *2 | HM-PE 1500d/2 | HM-PE 1500d/2 | HM-PE 1500d/2 | HM-PE 1500d/2 | HM-PE 1500d/2 | HM-PE 1500d/2 | HM-PE 1500d/2 | HM-PE 1500d/2 |
| Finished cord count (ends/5 cm) | 53.5 | 53.5 | 53.5 | 53.5 | 53.5 | 53.5 | 53.5 | 53.5 |
| Cord angle (deg.) | 90 | 90 | 90 | 90 | 90 | 90 | 90 | 90 |
| Heat shrinkage percentage K2(%) | 4.7 | 4.7 | 4.7 | 4.7 | 4.7 | 4.7 | 4.7 | 7.0 |
| *Outer carcass ply* | | | | | | | | |
| No. of ply | 1 | 1 | 1 | 1 | 1 | 1 | 1 | 1 |
| Ply type *1 | DWN | DWN | DWN | DWN | DWN | DWN | DWN | DWN |
| Cord material *2 | RG-PE 1500d/2 | HM-PE 1500d/2 | RG-PE 1500d/2 | HM-PE 1500d/2 | RG-PE 1500d/2 | HM-PE 1500d/2 | RG-PE 1500d/2 | HM-PE 1500d/2 |
| Finished cord count (ends/5 cm) | 53.5 | 53.5 | 53.5 | 53.5 | 53.5 | 53.5 | 53.5 | 53.5 |
| Cord angle (deg.) | 90 | 90 | 90 | 90 | 90 | 90 | 90 | 90 |
| Heat shrinkage perentage K2(%) | 6.5 | 4.7 | 6.5 | 4.7 | 6.5 | 4.7 | 6.5 | 4.7 |
| K1/K2 ratio | 1.38 | 1.0 | 1.38 | 1.0 | 1.38 | 1.0 | 1.38 | 1.0 |
| BELT | | | | | | | | |

TABLE 2-continued

|  | Ex.b | Conven.b | Ex.c | Conven.c | Ex.d | Conven.d | Ex.e | Conven.e |
|---|---|---|---|---|---|---|---|---|
| No. of ply | 2 | 2 | 2 | 2 | 2 | 2 | 2 | 2 |
| Cord material | steel | steel | steel | steel | steel | steel | steel | steel |
| Finished cord count (ends/5 cm) | 34 | 34 | 34 | 34 | 34 | 34 | 34 | 34 |
| Finished cord angle (deg.) | 24 | 24 | 24 | 24 | 24 | 24 | 24 | 24 |
| Test Result *3 | | | | | | | | |
| Noise | | | | | | | | |
| Overall | −0.9 | 0 | −1.1 | 0 | −0.2 | 0 | −0.9 | 0 |
| 125 Hz | −0.7 | 0 | −0.8 | 0 | −0.1 | 0 | −0.7 | 0 |
| 250 Hz | −1.4 | 0 | −1.6 | 0 | −0.4 | 0 | −1.5 | 0 |
| Steering stability | A | A | A | A | A | A | A | A |
| Ride comfort | A | A | A | A | A | A | B | A |
| Flat spot resistance | A | A | A | A | A | A | A | A |
| Tire uniformity | A to B | A | B | A | A | A | A | A |

1) TUP = turned up DWN = not turned up
2) HM-PE = High modulus polyester RG-PE = Regular polyester
3) A = Good, B = a little no good, C = No good

We claim:

1. A pneumatic tire which exhibits reduced road noise which comprises a tread portion, a pair of axially spaced bead portions, each with a bead core therein, a pair of sidewall portions, a carcass comprising an inner ply and an outer ply, each extending between the bead portions, a belt disposed radially outside the carcass and inside the tread portion, wherein the outer carcass ply is made of cords having a first heat-shrinkage-percentage K1 and the inner carcass ply is made of cords having a second heat-shrinkage-percentage K2 whereby the first heat-shrinkage-percentage K1 is 130 to 150% of the second heat-shrinkage-percentage K2 so that the cord tension of the inner carcass ply is smaller than the cord tension of the outer carcass ply.

2. The pneumatic tire according to claim 1, wherein the inner carcass ply is turned up around the bead cores from the axially inside to outside thereof to form a pair of turnup portions, and the outer carcass ply is not turned up around the bead cores so that each of the radially inner edges thereof terminates near the axially inside or outside of the respective bead core.

3. The pneumatic tire according to claim 2, wherein the radially inner edges of the outer carcass ply are disposed on the axially inside of the turnup portions of the inner carcass ply.

4. The pneumatic tire according to claim 3, wherein said cords having the first heat-shrinkage-percentage K1 and said cords having the second heat-shrinkage-percentage K2 are shrunk by heating during vulcanization of process for the tire.

5. The pneumatic tire according to claim 2, wherein each of the radially inner edges of the outer carcass ply is disposed on the axially outside of one of the turnup portions of the inner carcass ply.

6. The pneumatic tire according to claim 5, wherein said cords having the first heat-shrinkage-percentage K1 and said cords having the second heat-shrinkage-percentage K2 are shrunk by heating during vulcanization of process for the tire.

7. The pneumatic tire according to claim 2, wherein said cords having the first heat-shrinkage-percentage K1 and said cords having the second heat-shrinkage-percentage K2 are shrunk by heating during vulcanization of the tire.

8. The pneumatic tire of claim 1 wherein the heat-shrinkage-percentage K2 of the inner carcass ply cords is from 3.5 to 5.0%.

9. A pneumatic tire which exhibits reduced road noise which comprises a tread portion, a pair of axially spaced bead portions, each with a bead core therein, a pair of sidewall portions, a carcass comprising an inner ply and an outer ply, each extending between the bead portions, the inner carcass ply being turned up around the bead cores from the axially inside to outside thereof to form a pair of turnup portions, the outer carcass ply not being turned up around the bead cores so that each of the radially inner edges thereof terminates near the axially inside or outside of the respective bead core, a belt disposed radially outside the carcass and inside the tread portion, wherein each of the radially inner edges of the outer carcass ply is disposed between the inner carcass ply turnup portion and the bead core in each of the bead portions, and the outer carcass ply is made of cords having a first heat-shrinkage-percentage K1 and the inner carcass ply is made of cords having a second heat-shrinkage-percentage K2 whereby the first heat-shrinkage-percentage K1 is 130 to 150% of the second heat-shrinkage-percentage K2 so that the cord tension of the inner carcass ply is smaller than the cord tension of the outer carcass ply.

* * * * *